United States Patent
Tseng et al.

(10) Patent No.: US 9,074,954 B2
(45) Date of Patent: *Jul. 7, 2015

(54) READOUT APPARATUS AND DRIVING METHOD FOR SENSOR

(75) Inventors: Kuo-Hua Tseng, New Taipei (TW); Chang-Ho Liou, Changhua County (TW); Wen-Ching Ko, Kaohsiung (TW); Yan-Rung Lin, Hsinchu (TW); Kuan-Wei Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 364 days.

This patent is subject to a terminal disclaimer.

(21) Appl. No.: 13/620,732

(22) Filed: Sep. 15, 2012

(65) Prior Publication Data
US 2014/0021969 A1 Jan. 23, 2014

(30) Foreign Application Priority Data
Jul. 19, 2012 (TW) .............................. 101126061 A

(51) Int. Cl.
G01R 27/02 (2006.01)
G01L 1/20 (2006.01)
G01L 1/26 (2006.01)

(52) U.S. Cl.
CPC .. G01L 1/205 (2013.01); G01L 1/26 (2013.01)

(58) Field of Classification Search
CPC . G06F 3/0414; G06F 3/0416; G06F 3/03545; G06F 2203/04105; G06F 3/044; G06F 3/0488; G01R 27/00; G01R 27/26
USPC ........................... 324/693, 720; 345/174, 173
See application file for complete search history.

(56) References Cited

U.S. PATENT DOCUMENTS

| 5,905,209 | A * | 5/1999 | Oreper ..................... 73/862.045 |
| 5,916,180 | A | 6/1999 | Cundari et al. |
| 6,009,744 | A * | 1/2000 | Kovalchick et al. .............. 73/40 |
| 2005/0220673 | A1 | 10/2005 | Thaysen |
| 2009/0284398 | A1* | 11/2009 | Shen et al. ...................... 341/33 |
| 2011/0091052 | A1 | 4/2011 | Wang |
| 2011/0208071 | A1 | 8/2011 | Lu et al. |

(Continued)

FOREIGN PATENT DOCUMENTS

| CN | 101191738 | 6/2008 |
| CN | 101394496 | 3/2009 |
| CN | 101848677 | 9/2010 |

(Continued)

OTHER PUBLICATIONS

"Office Action of Taiwan Counterpart Application", issued on Sep. 9, 2014, p. 1-p. 7.
Mills et al., "A Multiplexed Impedance Analyzer for Characterizing Polymer-Coated QCM Sensor Arrays", IEEE Sensors Journal, Aug. 2006, vol. 6, No. 4 p. 996-p. 1002.
Baek et al., "A Smart Health Monitoring Chair for Nonintrusive Measurement of Biological Signals", IEEE Transactions on Information Technology in Biomedicine, Jan. 2012, vol. 16, No. 1, p. 150-p. 158.

(Continued)

Primary Examiner — Arleen M Vazquez
Assistant Examiner — Neel Shah
(74) Attorney, Agent, or Firm — Jianq Chyun IP Office

(57) ABSTRACT

A readout apparatus and a driving method for sensor are provided. The readout apparatus includes an adjustable bias unit, a sensor unit, a signal converting unit, a checking unit and a control unit. The sensor unit senses physical energy and outputs a sensing result by using a bias voltage outputted from the adjustable bias unit. The control unit controls the adjustable bias unit according to the sensing result, so as to adjust the bias voltage. Therefore, the readout apparatus can reduce continuous power loss caused by long-term detection.

37 Claims, 8 Drawing Sheets

(56) References Cited

U.S. PATENT DOCUMENTS

| | | | |
|---|---|---|---|
| 2012/0053424 A1* | 3/2012 | Kenalty et al. | 600/300 |
| 2013/0088247 A1* | 4/2013 | Tseng et al. | 324/693 |

FOREIGN PATENT DOCUMENTS

| | | |
|---|---|---|
| EP | 1499864 | 12/2006 |
| TW | 416030 | 12/2000 |
| TW | 439027 | 6/2001 |
| TW | I271094 | 1/2007 |
| TW | 200837618 | 9/2008 |
| TW | 200947291 | 11/2009 |
| TW | 201007149 | 2/2010 |
| TW | 201113747 | 4/2011 |
| TW | 201131483 | 9/2011 |
| TW | 201227189 | 7/2012 |
| WO | 03071258 | 8/2003 |

OTHER PUBLICATIONS

Palasagaram et al., "MEMS Capacitive Pressure Sensor Array fabricated Using Printed Circuit Processing Techniques", 31st Annual Conference of IEEE Industrial Electronics Society, 2005, p. 2357-p. 2362.

Cannata et al., "Processing of Tactile/Force Measurements for a Fully Embedded Sensor", 2006 IEEE International Conference on Multisensor Fusion and Integration for Intelligent Systems, Sep. 3-6, 2006, p. 160-p. 166.

Luo et al., "Sensors and Actuators for Intelligent Mechatronic Systems", IECON'O1: The 27th Annual Conference of the IEEE Industrial Electronics Society, 2001, p. 2062-p. 2065.

"Office Action of China Counterpart Application", issued on Feb. 27, 2015, p. 1-p. 13.

* cited by examiner

READOUT APPARATUS AND DRIVING METHOD FOR SENSOR

CROSS-REFERENCE TO RELATED APPLICATION

This application claims the priority benefit of Taiwan application serial no. 101126061, filed on Jul. 19, 2012. The entirety of the above-mentioned patent application is hereby incorporated by reference herein and made a part of this specification.

TECHNICAL FIELD

The disclosure relates to a sensor. The disclosure relates to a readout apparatus and a driving method for sensor.

BACKGROUND

Along with improvement of lifestyle and development of technology, besides electronic products having features of lightness, slimness, shortness and smallness, people have a great demand for electronic products having features of curling, easy to carry, comfortable touch feeling, low power consumption and easy maintenance, etc. However, the present semiconductors and electronic parts and components, etc. are all rigid materials, so that a product design thereof cannot satisfy the aforementioned demand. Therefore, flexible electronic parts and components technology is developed. A current variable-resistance array sensing device has advantages of easy usage, lightness and thinness, flexibility, irregular shape, drop proof, suitable for being fabricated through screen printing, suitable for customizing into different sizes and shapes, and simple structure, etc. Regardless of a single-point or an array type flexible variable-resistance pressure sensing device, in a macro perspective, equivalent circuits thereof are all variable resistors. However, a resistance value of the flexible pressure sensing device is varied along with a pressure variation, and a resistance variation range thereof is between several million ohms and several ohms. Regarding a conventional driving circuit, it is difficult to effectively readout a correct resistance value (a pressure value) of the flexible pressure sensing device from such large resistance variation range.

On the other hand, regarding a usage situation that the pressure is required to be monitored in long-term (for example, application products such as home medical care mattress/cushions, factory automation equipment, etc.), the conventional driving circuit may have a problem of large power loss due to that a pressure-resistance relationship curve of the pressure sensing device is a negative characteristic curve (i.e. the greater the pressure is, the smaller the resistance value is). A table 1 lists a relationship of resistance values and power loss of the pressure sensing device when different pressures are applied to the pressure sensing device. It is assumed that a bias voltage of the pressure sensing device is 3.3V. According to the table 1, it is known that when the flexible pressure sensing device is subjected to a smaller pressure (or no pressure), the resistance value of the pressure sensing device is about 1M ohm, and a power loss thereof P=I*I*R=0.00001089 W. When the flexible pressure sensing device is subjected to a medium pressure, the resistance value thereof is about 1000 ohm, and the power loss thereof P=0.01089 W (which is about 1000 times difference compared to the power loss without pressure). When the flexible pressure sensing device is subjected to a large pressure, the resistance value thereof is about 10 ohm, and the power loss thereof P=1.089 W (which is about 100000 times difference compared to the power loss without pressure).

TABLE 1 relationship of pressure and resistance value of pressure sensing device

| Pressure | Resistance value of sensing device (Ω) | Bias voltage (V) | Power (W) |
| --- | --- | --- | --- |
| Low pressure | 1000000 | 3.3 | 0.00001089 |
|  | 100000 | 3.3 | 0.0001089 |
|  | 10000 | 3.3 | 0.001089 |
|  | 1000 | 3.3 | 0.01089 |
|  | 100 | 3.3 | 0.1089 |
| High pressure | 10 | 3.3 | 1.089 |

When the flexible pressure sensing device is applied to a sleep quality mattress detection platform, to facilitate estimation, it is assumed that when a testee enters a deep sleep stage, the testee turns over the body once per hour. The pressure sensing device in the mattress are continuously subjected to a large pressure within the period of one hour. Regarding the pressure sensing device of the conventional driving circuit, the power loss of the pressure sensing device within the period of one hour probably exceeds 1 W. Therefore, during a sleep period of the testee, the pressure sensing device at least has power loss of 7-8 W.

Therefore, when the flexible pressure sensing device is applied to a system that requires to monitor pressure in long-term (for example, a home sleep quality monitoring system), the conventional driving circuit has unnecessary electric energy loss due to that the flexible pressure sensing device is in a large pressure environment for a long time.

SUMMARY

The disclosure provides a readout apparatus for sensor. The readout apparatus includes an adjustable bias unit, a sensor unit, a signal converting unit, a checking unit and a control unit. The adjustable bias unit adjusts and outputs a bias voltage. A bias terminal of the sensor unit is coupled to the adjustable bias unit for receiving the bias voltage. The sensor unit senses physical energy by using the bias voltage, and outputs a sensing result. An input terminal of the signal converting unit is coupled to an output terminal of the sensor unit for receiving the sensing result, and outputs an electric signal according to the sensing result. An input terminal of the checking unit is coupled to the signal converting unit for receiving and checking the electric signal, and outputs a checking result. The control unit is coupled to an output terminal of the checking unit and the adjustable bias unit. The control unit controls the adjustable bias unit to adjust the bias voltage according to the checking result.

The disclosure provides a driving method for sensor, which includes following steps. An adjustable bias unit adjusts and outputs a bias voltage to a bias terminal of a sensor unit. The sensor unit senses physical energy by using the bias voltage, so as to obtain a sensing result. The sensing result is converted into an electric signal. The electric signal is checked to obtain a checking result. The adjustable bias unit is controlled to adjust the bias voltage according to the checking result.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
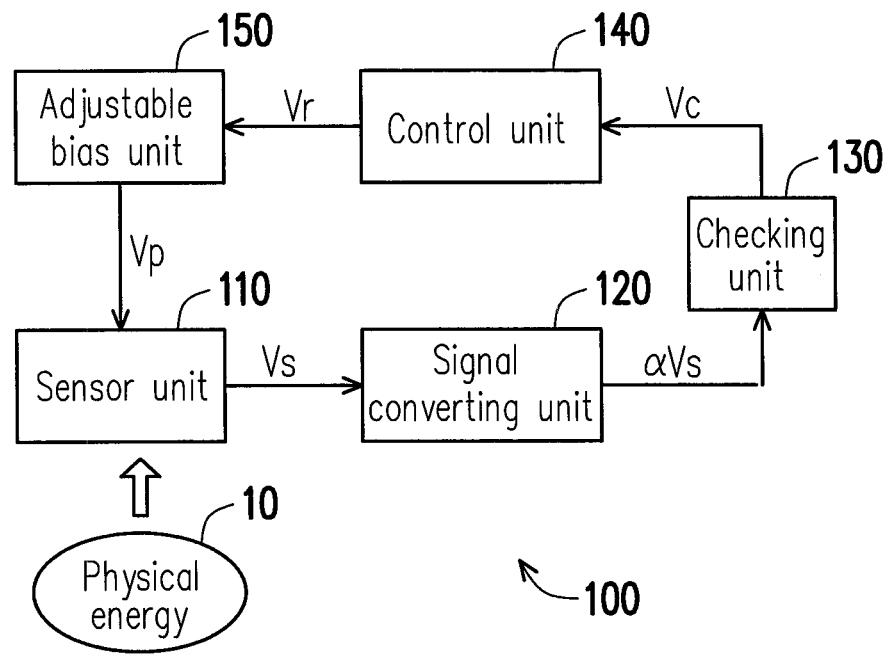
FIG. 1 is a functional block schematic diagram of a readout apparatus 100 for sensor according to an embodiment of the disclosure.

FIG. 1 is a functional block schematic diagram of a readout apparatus 100 for sensor according to an embodiment of the disclosure. The readout apparatus 100 for sensor includes a sensor unit 110, a signal converting unit 120, a checking unit 130, a control unit 140 and an adjustable bias unit 150. The adjustable bias unit 150 adjusts and outputs a bias voltage Vp according to a control signal Vr of the control unit 140. A bias terminal of the sensor unit 110 is coupled to the adjustable bias unit 150 for receiving the bias voltage Vp. The sensor unit 110 may include a single sensor or a plurality of sensors. The sensor unit 110 senses physical energy 10 by using the bias voltage Vp, and outputs a sensing result Vs to the signal converting unit 120. Under different application conditions, the physical energy 10 can be light energy, electromagnetic energy, mechanical energy or other energy. For example, the physical energy 10 can be mechanical energy such as pressure or gravity, etc., and the sensor unit 110 may include one or more capacitive pressure sensors or resistive pressure sensors. In the present embodiment, a flexible pressure sensing device is used to implement the sensor unit 110.

An input terminal of the signal converting unit 120 is coupled to an output terminal of the sensor unit 110 for receiving the sensing result Vs, and outputs an electric signal $\alpha Vs$ according to the sensing result Vs. In different embodiments, based on different sensing manners of the sensor unit 110, the sensing result Vs probably has different energy patterns (for example, energy patterns of current and voltage, etc.). The signal converting unit 120 converts the sensing result Vs into an energy pattern (for example, voltage) that can be processed by the checking unit 130 and the control unit 140. In some embodiments, the signal converting unit 120 may gain the sensing result Vs (for example, a gain value of $\alpha$) to output as the electric signal $\alpha Vs$.

An input terminal of the checking unit 130 is coupled to the signal converting unit 120 for receiving and checking the electric signal $\alpha Vs$. An output terminal of the checking unit 130 outputs a checking result Vc. The physical energy 10 sensed by the sensor unit 110 is reflected on the electric signal $\alpha Vs$, so that the checking unit 130 can determine a state of the sensor unit 110 by checking the electric signal $\alpha Vs$, and output the checking result Vc to the control unit 140.

The control unit 140 can be a control circuit such as a microcontroller, a microprocessor, a central processing unit (CPU), etc. The control unit 140 is coupled to an output terminal of the checking unit 130 and a control terminal of the adjustable bias unit 150. Since the checking result Vc corresponds to a magnitude of the physical energy 10, the control unit 140 can learn the magnitude of the physical energy 10 detected by the sensor unit 110 according to the checking result Vc. In some embodiments, the control unit 140 calculates the magnitude of the physical energy 10 detected by the sensor unit 110 or calculates a resistance value of the sensor unit 110 according to the checking result Vc through an algorithm. Based on the resistance value or the physical energy of the sensor unit 110, the control unit 140 can further calculate an ideal value of the bias voltage Vp.

In other embodiments, the control unit 140 has a lookup table. The lookup table records a relationship between the physical energy 10 and the bias voltage Vp. The control unit 140 can deduce the physical energy 10 according to the electric signal $\alpha Vs$ or the checking result Vc, and further determine the bias voltage Vp of the adjustable bias unit 150 from the lookup table according to the physical energy 10.

Therefore, the control unit 140 controls the adjustable bias unit 150 according to the checking result Vc. The control signal Vr output from the control unit 140 can control and adjust the bias voltage Vp of the adjustable bias unit 150. Moreover, the control unit 140 can record a value of the physical energy 10 in a storage medium, and/or present the value of the physical energy 10 to the user through a display device.

Figure 2:
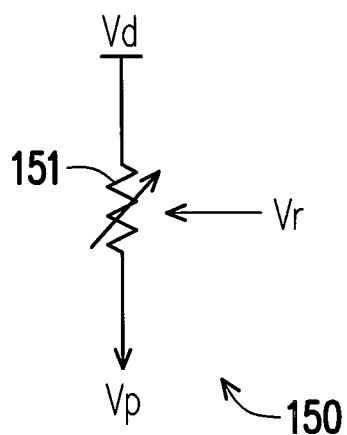
FIG. 2 is a circuit schematic diagram of an adjustable bias unit of FIG. 1 according to an embodiment of the disclosure.

The adjustable bias unit 150 can be a controllable voltage source of any type. For example, FIG. 2 is a circuit schematic diagram of the adjustable bias unit 150 of FIG. 1 according to an embodiment of the disclosure. The adjustable bias unit 150 includes a variable resistor 151. A first terminal of the variable resistor 151 is coupled to a voltage source for receiving a fixed voltage Vd. A second terminal of the variable resistor 151 outputs the bias voltage Vp. A resistance value of the variable resistor 151 is controlled by the control signal Vr of the control unit 140. Therefore, the bias voltage Vp can be adjusted along with variation of the control signal Vr.

Figure 3:
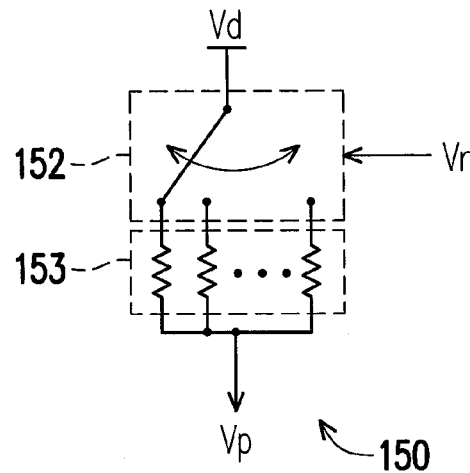
FIG. 3 is a circuit schematic diagram of the adjustable bias unit of FIG. 1 according to another embodiment of the disclosure.

For example, FIG. 3 is a circuit schematic diagram of the adjustable bias unit 150 of FIG. 1 according to another embodiment of the disclosure. The adjustable bias unit 150 includes a switch 152 and a plurality of resistors 153. First terminals of the resistors 153 are commonly coupled to a bias terminal of the sensor unit 110 for outputting the bias voltage VP. Resistance values of the resistors 153 are different. A common terminal of the switch 152 is coupled to a voltage source for receiving the fixed voltage Vd. A plurality of selection terminals of the switch 152 are correspondingly coupled to second terminals of the resistors 153. The switch 152 is controlled by the control signal Vr of the control unit 140, and selectively couples the fixed voltage Vd of the voltage source to the second terminal of one of the resistors 153.

Referring to FIG. 1, when the checking result Vc of the checking unit 130 indicates that the physical energy 10 is not applied to the sensor unit 110, the control unit 140 controls the adjustable bias unit 150 to output an initial voltage to serve as the bias voltage Vp. The initial voltage is a maximum bias voltage preset according to a characteristic of the sensor unit 110, for example, 3.3V, 5V or other fixed voltages. When the physical energy 10 (for example, pressure) is applied to the sensor unit 110, the control unit 140 learns the variation of the physical energy 10 according to the checking result Vc of the checking unit 130. When the checking result Vc of the checking unit 130 indicates that the physical energy 10 is applied to the sensor unit 110, the control unit 140 enters a low power mode, and controls the adjustable bias unit 150 to decrease the bias voltage Vp. In other embodiments, the control unit 140 operated in the low power mode further reduces a frequency that the readout apparatus 100 reads the sensor unit 110.

When the physical energy 10 (for example, pressure) is applied to the sensor unit 110, the control unit 140 can control the adjustable bias unit 150 to correspondingly adjust the bias voltage Vp to reduce a power loss of the sensor unit 110 that is in a large pressure environment for a long time. For example, it is assumed that the sensor unit 110 includes one or a plurality of flexible pressure sensing devices, and the sensor unit 110 is regarded as a variable resistor, where a resistance value of the sensor unit 110 decreases as the pressure (the physical energy 10) applied thereon increases. When the checking result Vc indicates that the pressure (the physical energy 10) applied to the sensor unit 110 increases, the control unit 140 controls the adjustable bias unit 150 to correspondingly decrease the bias voltage Vp to reduce a power loss of the sensor unit 110 due to that the flexible pressure sensing devices are in a large pressure environment for a long time.

Figure 4:
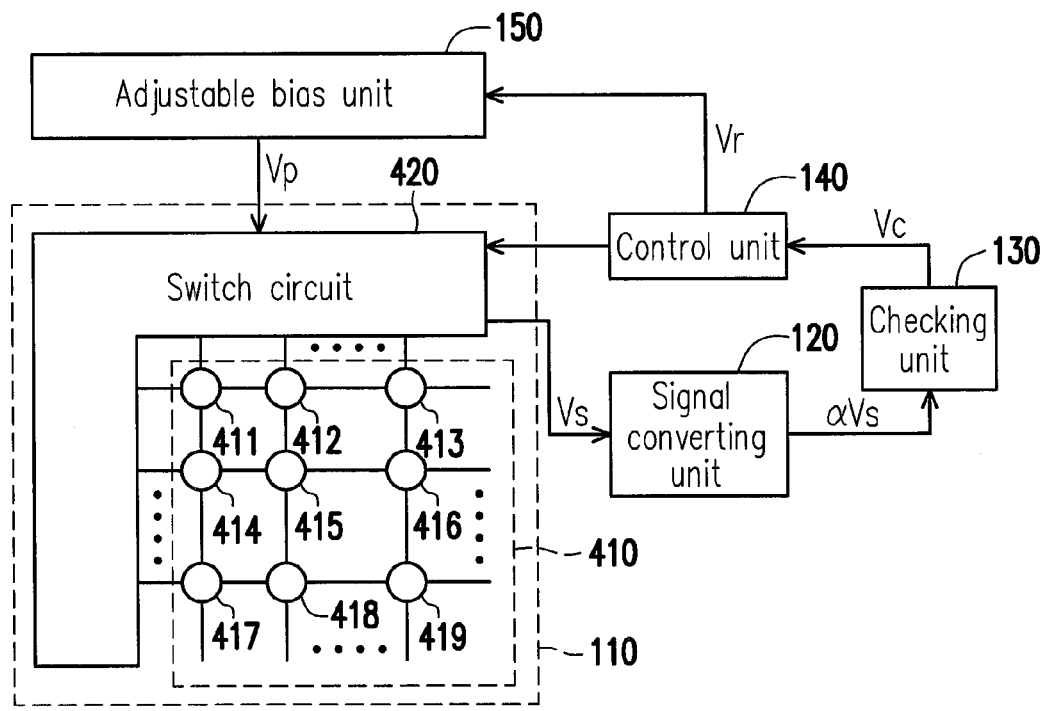
FIG. 4 is a circuit schematic diagram of a sensor unit of FIG. 1 according to an embodiment of the disclosure.

FIG. 4 is a circuit schematic diagram of the sensor unit 110 of FIG. 1 according to an embodiment of the disclosure. Description of the embodiment of FIG. 4 can refer to related descriptions of FIG. 1 to FIG. 3. Referring to FIG. 4, the sensor unit 110 includes a sensor array 410 and a switch circuit 420. The switch circuit 420 is coupled to the sensor array 410. The sensor array 410 includes a plurality of sensors, for example, sensors 411, 412, 413, 414, 415, 416, 417, 418 and 419, etc. shown in FIG. 4. The symbols 411-419 shown in FIG. 4 are not used to indicate/limit the number of the sensors in the sensor array 410. The sensors 411, 412, 413, 414, 415, 416, 417, 418 and 419 serve as a pressure sensor. Those skilled in the art can deduce sensor arrays with other layout structures and sensor numbers according to the instruction of the sensor array 410 of the present embodiment.

For simplicity's sake, the sensors 411-419 of the present embodiment can be variable-resistance pressure sensors. When a sensor is subjected to an external pressure, a resistance value of the sensor is varied along with variation of the pressure. The control unit 140 controls the switch circuit 420 to perform a switch operation, so as to select a target sensor from the sensors 411-419. The switch circuit 420 performs the switch operation to switch the bias voltage Vp to the target sensor, and the switch circuit 420 couples a reference voltage (for example, a ground voltage or a system lowest voltage) lower than the bias voltage Vp to the other sensors in the sensors 411-419 other than the target sensor. The signal converting unit 120 selectively senses/reads out a sensing value of the target sensor in the sensors 411-419 according to the switch operation of the switch circuit 420, and gains the sensing result (the sensing value) for outputting to the checking unit 130 to serve as the electric signal αVs. The checking unit 130 correspondingly outputs the checking result Vc to the control unit 140 according to the electric signal αVs.

Therefore, the control unit 140 learns a pressure sensing result of each of the sensors 411-419 in the sensor array 410, and displays pressure distribution through an interface display apparatus.

Figure 5:
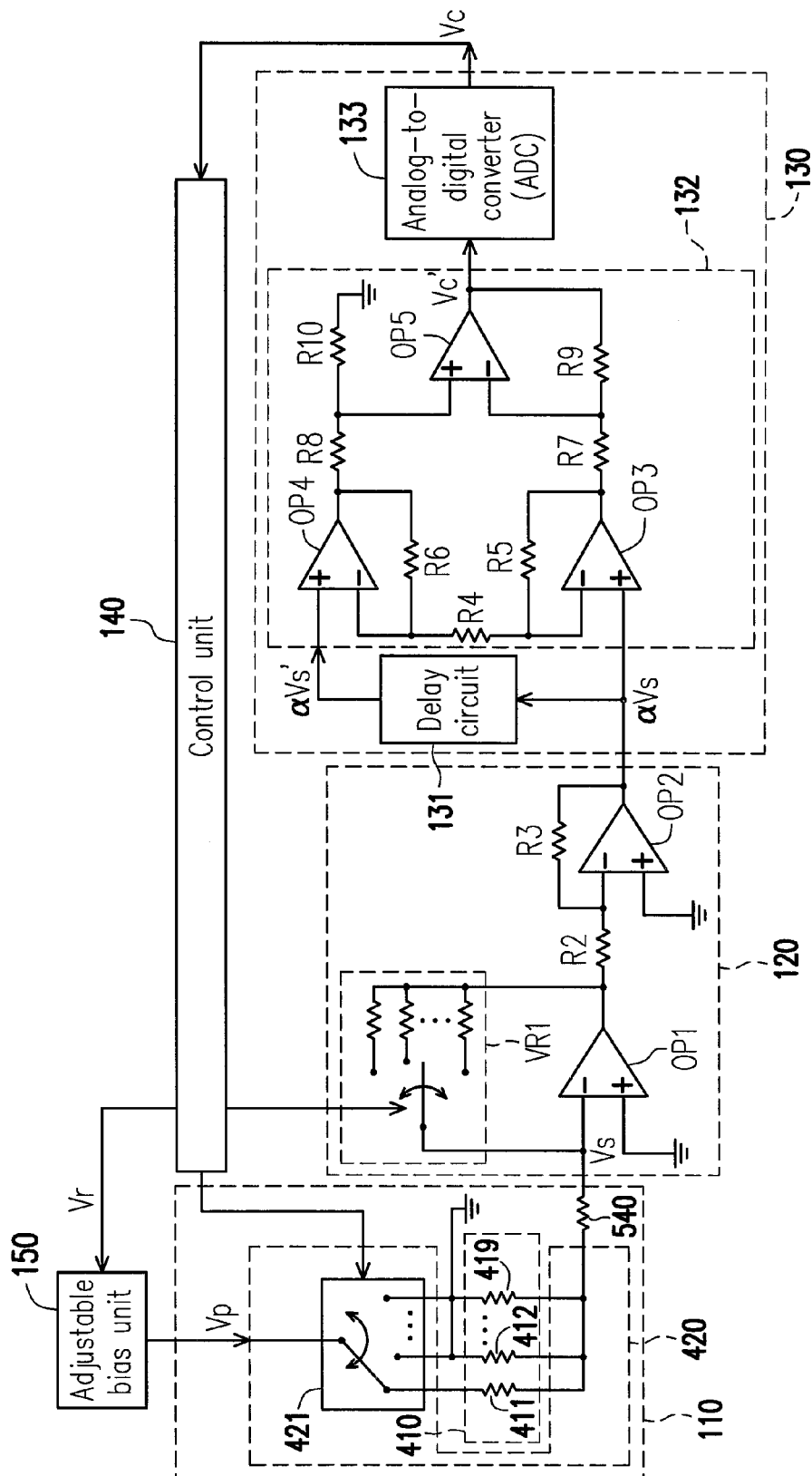
FIG. 5 is a circuit schematic diagram of the readout apparatus of FIG. 1 according to an embodiment of the disclosure.

FIG. 5 is a circuit schematic diagram of the readout apparatus 100 of FIG. 1 according to an embodiment of the disclosure. Description of the embodiment of FIG. 5 can refer to related descriptions of FIG. 1 to FIG. 4. Referring to FIG. 5, the sensors 411-419 of the present embodiment are variable-resistance pressure sensors, so that resistor symbols are used to represent the sensors 411-419 in FIG. 5. When a sensor is subjected to an external pressure, a resistance value of the sensor is varied along with variation of the pressure. The switch circuit 420 is coupled to the sensor array 410 and the control unit 140. The control unit 140 controls the switch circuit 420 to perform a switch operation, so as to select a target sensor from the sensors 411-419 of the sensor array 410.

For example, when the control unit 140 controls a switch 421 of the switch circuit 420 to switch the bias voltage Vp to the sensor 411, the switch circuit 420 couples a reference voltage (for example, the ground voltage or the system lowest voltage) lower than the bias voltage Vp to the other sensors 412-419 other than the target sensor 411 (shown in FIG. 5), which is equivalent to that the switch circuit 420 performs the switch operation to select the sensor 411 from the sensors 411-419 of the sensor array 410 to serve as the target sensor.

For another example, when the control unit 140 controls the switch 421 to switch the bias voltage Vp to the sensor 412, the switch circuit 420 couples the reference voltage (for example, the ground voltage) to the other sensors (for example, the sensor 411, the sensor 419, etc.) other than the target sensor 412. The switch 421 of the switch circuit of FIG. 5 is an example, and those known sensor array switch mechanisms/manners in the art can all be applied to implement the switch circuit 420.

An overload protector 540 is illustrated in FIG. 5, and the overload protector 540 can be an overload protection resistor. The overload protector 540 is connected in series between the target sensor and the signal converting unit 120, i.e. between the sensor array 410 and the signal converting unit 120. When the sensors 411-419 are subjected to a large pressure, the resistance values of the sensors approach to a short-circuit resistance (i.e. approach to 0Ω), and now regardless of whether the switch circuit 420 drives the sensor array 410 in a constant current bias manner (not shown) or a constant voltage bias manner (shown in FIG. 5), the sensor subjected to excessive pressure in the sensors 411-419 probably generates an excessive current or voltage to cause a wrong operation of the system. The overload protector 540 can reduce an impact of the current or voltage on the signal converting unit 120. In other embodiments, if the system can tolerate a maximum current or a maximum voltage probably generated by the sensors 411-419, or if the sensors 411-419 do not approach to the shirt-circuit resistance no matter how great the subjected pressure is, the overload protector 540 can be omitted.

In other embodiments, the sensor unit 110 further includes a thermal resistor (not shown in FIG. 5). The thermal resistor is connected in parallel with the overload protector 540, and is connected in series between the sensor array 410 and the signal converting unit 120. Alternatively, the thermal resistor and the overload protector 540 are connected in series between the sensor array 410 and the signal converting unit 120. If the sensors 411-419 are resistors having positive temperature coefficients, the thermal resistor has a negative temperature coefficient. Conversely, if the sensors 411-419 are resistors having negative temperature coefficients, the thermal resistor has a positive temperature coefficient.

In a different embodiment, the overload protector 540 can be a thermal resistor. For example, if the sensors 411-419 are resistors having positive temperature coefficients, the overload protector 540 has a negative temperature coefficient. Conversely, if the sensors 411-419 are resistors having negative temperature coefficients, the overload protector 540 has a positive temperature coefficient.

Referring to FIG. 5, it is assumed that the switch circuit 420 selects the sensor 411 from the sensors 411-419 to serve as the target sensor under control of the control unit 140, one terminal of the target sensor 411 receives the bias voltage Vp, and the other terminal of the target sensor 411 outputs the sensing result Vs through the overload protector 540. According to the switch operation of the switch circuit 420, the signal converting unit 120 selectively senses the target sensor 411, and gains the sensing result Vs (for example, a gain value of $\alpha$) for outputting as a gain sensing value of the target sensor 411, i.e. outputs the electric signal $\alpha$Vs to the checking unit 130. The gain value $\alpha$ is dynamically determined by the control unit 140. In this way, different gain values can be dynamically determined according to response gains of different sensors, and the sensing result is gained according to the corresponding gain value. Therefore, the readout apparatus of the present embodiment can reduce an influence caused by a fabrication process or material error of the sensing device.

The signal converting unit 120 includes a first amplifier OP1 and a first variable resistor unit VR1. A non-inverted input terminal of the first amplifier OP1 is coupled to a reference voltage (for example, the ground voltage or other fixed voltage), an inverted input terminal of the first amplifier OP1 is coupled to a certain target sensor in the sensors 411-419 of the sensor unit 110 according to the switch operation of the switch circuit 420. A first terminal and a second terminal of the first variable resistor unit VR1 are respectively coupled to the inverted input terminal and an output terminal of the first amplifier OP1. The first variable resistor unit VR1 is controlled by the control unit 140. A resistance value of the first variable resistor unit VR1 is varied along with the switch operation of the switch circuit 420. In the present embodiment, the first variable resistor unit VR1 includes a plurality of resistors and a switch, where resistance values of the resistors are different to each other. First terminals of the resistors are commonly coupled to the output terminal of the first amplifier OP 1. According to the switch operation of the switch circuit 420, the switch selectively couples the inverted input terminal of the first amplifier OP1 to a second terminal of one of the resistors, as that shown in FIG. 5.

In the present embodiment, if the sensor array 410 has in sensors, the number of the resistors in the first variable resistor unit VR1 can also be m, i.e. the resistors in the first variable resistor unit VR1 one-to-one correspond to the sensors in the sensor array 410. Therefore, by dynamically adjusting the resistance value through the first variable resistor unit VR1, the signal converting unit 120 may generate different gain values a corresponding to different sensors in the sensor array 410.

In other embodiments, a characteristic of the sensor can be described by a "load to sensing value characteristic curve", where a vertical axis of the characteristic curve represents load weights (pressures) applied to the sensor, and a horizontal axis of the characteristic curve represent sensing values read by the readout apparatus 100. The sensors 411-419 are grouped into a plurality of grouped according to magnitudes of slopes of the respective "load to sensing value characteristic curves", so that the number of the resistors in the first variable resistor unit VR1 can be matched to the number of the groups of the sensors 411-419. For example, if the sensors 411-419 are grouped into three groups, at least three resistors are required in the first variable resistor unit VR1. Therefore, by dynamically adjusting the resistance value through the first variable resistor unit VR1, the signal converting unit 120 may generate different gain values a corresponding to different groups of the sensors 411-419.

Referring to FIG. 5, the signal converting unit 120 further includes a second amplifier OP2, a second resistor R2 and a third resistor R3. A non-inverted input terminal of the second amplifier OP2 is coupled to the reference voltage (for example, the ground voltage or the other fixed voltage). A first terminal and a second terminal of the second resistor R2 are respectively coupled to the output terminal of the first amplifier OP1 and an inverted input terminal of the second amplifier OP2. A first terminal and a second terminal of the third resistor R3 are respectively coupled to the inverted input terminal and an output terminal of the second amplifier OP2. The output terminal of the second amplifier OP2 provides the electric signal $\alpha$Vs to the checking unit 130. In the embodiment of FIG. 5, it is assumed that a gain value of the first amplifier OP1 is $\alpha$1 and a gain value of the second amplifier OP2 is $\alpha$2, and the gain value $\alpha$ of the signal converting unit 120 is $\alpha1 \times \alpha2$.

Assuming the resistance value of the target sensor in the sensors 411-419 is Rs and the resistance value of the overload protector 540 is R0, the sensing result Vs is Vp/(Rs+R0). An output VA of the first amplifier is $-VR1 \times Vs$. The output $\alpha$Vs of the second amplifier OP2 is $VR1 \times Vs \times (R3/R2)$, i.e. the gain value $\alpha$ of the signal converting unit 120 is $(VR1 \times R3)/R2$. By controlling the resistance value of the variable resistor unit VR1, the signal converting unit 120 dynamically determines different gain values $\alpha$, so as to perform gain adjustment on the sensing result Vs of different sensors 411-419, and compensate the slopes of "load to sensing value characteristic curves" of different sensors.

Referring to FIG. 5, the checking unit 130 includes a delay circuit 131, a comparison circuit 132 and an analog-to-digital converter (ADC) 133. An input terminal of the ADC 133 is coupled to an output terminal of the comparison circuit 132, and an output terminal of the ADC 133 is coupled to the control unit 140. The ADC 133 converts an analog output of the comparison circuit 132 into the digital checking result Vc, and transmits the checking result Vc to the control unit 140. In some embodiments, if the control unit 140 is capable of processing the analog signal, or the comparison circuit 132 can output the digital checking result Vc, the ADC 133 can be omitted.

An input terminal of the delay circuit 131 is coupled to the signal converting unit 120 for receiving the electric signal $\alpha$Vs. The delay circuit 131 delays the electric signal $\alpha$Vs to output a delayed signal $\alpha$Vs'. A first input terminal of the comparison circuit 132 is coupled to the signal converting unit 120 for receiving the electric signal $\alpha$Vs, and a second input terminal of the comparison circuit 132 is coupled to an output terminal of the delay circuit 131. The comparison circuit 132 receives and compares the electric signal $\alpha$Vs and the delayed signal $\alpha$Vs', and outputs an analog checking result Vc' to the ADC 133. Those skilled in the art can implement the comparison circuit 132 by any means according to the instruction of the present embodiment. For example, the comparison circuit 132 can be an error amplifier. An inverted input terminal of the error amplifier is coupled to the signal converting unit 120 for receiving the electric signal $\alpha$Vs, a non-inverted input terminal of the error amplifier is coupled to the output terminal of the delay circuit 131 for receiving the delayed signal αVs', and an output terminal of the error amplifier outputs the analog checking result Vc' to the ADC 133. For another example, the comparison circuit 132 can be a subtractor. The subtractor receives the electric signal αVs and the delayed signal αVs' and calculates a difference thereof, and outputs the difference to serve as the analog checking result Vc' of the target sensor (for example, the sensor 411).

In the embodiment of FIG. 5, the comparison circuit 132 includes a third amplifier OP3, a fourth amplifier OP4, a fifth amplifier OP5, a fourth resistor R4, a fifth resistor R5, a sixth resistor R6, a seventh resistor R7, an eighth resistor R8, a ninth resistor R9 and a tenth resistor R10. A non-inverted input terminal of the amplifier OP3 is coupled to the signal converting unit 120 for receiving the electric signal αVs. A non-inverted input terminal of the amplifier OP4 is coupled to the output terminal of the delay circuit 131 for receiving the delayed signal αVs'. A first terminal and a second terminal of the resistor R4 are respectively coupled to an inverted input terminal of the amplifier OP3 and an inverted input terminal of the amplifier OP4. A first terminal and a second terminal of the resistor R5 are respectively coupled to the inverted input terminal and an output terminal of the amplifier OP3. A first terminal and a second terminal of the resistor R6 are respectively coupled to the inverted input terminal and an output terminal of the amplifier OP4. A first terminal of the resistor R7 is coupled to the output terminal of the amplifier OP3. A first terminal of the resistor R8 is coupled to the output terminal of the amplifier OP4. An inverted input terminal of the amplifier OP5 is coupled to a second terminal of the resistor R7, a non-inverted input terminal of the amplifier OP5 is coupled to a second terminal of the resistor R8, and an output terminal of the amplifier OP5 outputs the analog checking result Vc' to the ADC 133. A first terminal and a second terminal of the resistor R9 are respectively coupled to the inverted input terminal and the output terminal of the amplifier OP5. A first terminal of the resistor R10 is coupled to the non-inverted input terminal of the amplifier OP5, and a second terminal of the resistor R10 is coupled to a reference voltage (for example, the ground voltage or other fixed voltage).

Figure 6:
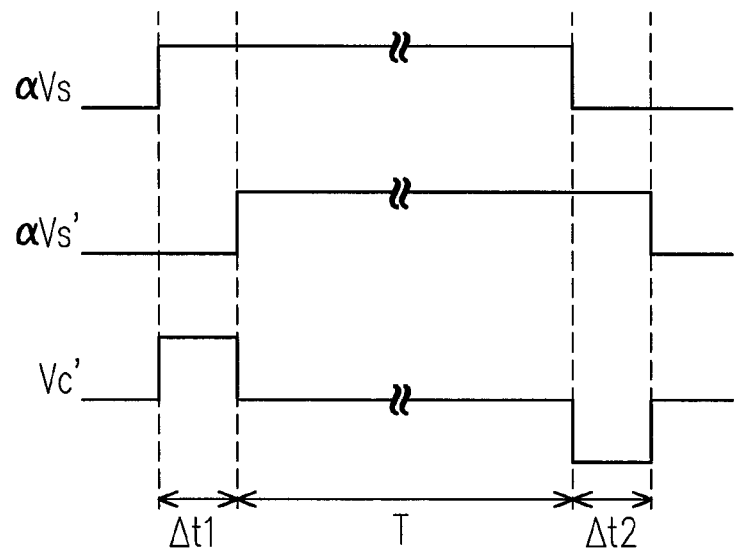
FIG. 6 is a timing schematic diagram of signals shown in FIG. 5 according to an embodiment of the disclosure.

FIG. 6 is a timing schematic diagram of the signals shown in FIG. 5 according to an embodiment of the disclosure. Referring to FIG. 5 and FIG. 6, when a pressure (physical energy) is not applied to any one of the sensors in the sensor unit 110, the electric signal αVs and the delayed signal αVs' are all in a low voltage level. When the pressure is applied to the sensor unit 110, the electric signal αVs is pulled up to a high voltage level, where a voltage swing of the electric signal αVs corresponds to a magnitude of the pressure applied to the sensor unit 110. Due to a delay effect of the delay circuit 131, after a time period Δt1 that the electric signal αVs is transited to the high voltage level, the delayed signal αVs' is also transited to the high voltage level. During the time period Δt1, the comparison circuit 132 subtracts the delayed signal αVs' from the electric signal αVs to obtain the checking result Vc' of a positive pulse. Therefore, the control unit 140 learns that the sensor unit 110 is subjected to a pressure according to the positive pulse in the checking result Vc' (or Vc). A voltage swing of the positive pulse in the checking result Vc' corresponds to a magnitude of the pressure applied to the sensor unit 110, and the voltage swing of the positive pulse in the checking result Vc' also corresponds to a resistance value of the sensor unit 110. Therefore, the control unit 140 can obtain the magnitude of the transient pressure applied to the sensor unit 110 according to the voltage swing of the positive pulse.

Then, it is assumed that the pressure applied to the sensor unit 110 is not changed during a time period T (for example, one hour), so that the electric signal αVs and the delayed signal αVs' are all in the high voltage level, and the checking result Vc' is maintained to the low voltage level (for example, 0V). The sensor unit 110 is subjected to a large pressure during the time period T, and the resistance value of the pressure sensor of the sensor unit 110 is decreased. In order to decrease a power loss of the sensor unit 110, the control unit 140 enters a low power mode during the time period T, and controls the adjustable bias unit 150 to correspondingly decrease the bias voltage Vp. For example, a table 2 lists a relationship between the pressure (the physical energy) applied to the sensor unit 110 and the bias voltage Vp.

TABLE 2 relationship between pressure and resistance of pressure sensing device

| Pressure | Sensor resistance (Ω) | Bias voltage Vp (V) | Power (W) |
|---|---|---|---|
| Low pressure | 1000000 | 3.3000 | 0.00001089 |
|  | 100000 | 1.0436 | 0.00001089 |
|  | 10000 | 0.3300 | 0.00001089 |
|  | 1000 | 0.1044 | 0.00001089 |
|  | 100 | 0.0330 | 0.00001089 |
| High pressure | 10 | 0.0104 | 0.00001089 |

In the table 2, it is assumed that the power loss of the pressure sensing device of the sensor unit 110 is maintained to about 0.00001089 W. Under such design condition, when the resistance value of the pressure sensing device is about 1000000 ohm, the control unit 140 controls the adjustable bias unit 150 to set the bias voltage Vp to 3.3V. When the resistance value of the pressure sensing device is about 10000 ohm, the control unit 140 sets the bias voltage Vp to 0.33V. When the resistance value of the pressure sensing device is about 10 ohm, the control unit 140 sets the bias voltage Vp to 0.0104V.

In the embodiment of the table 2, the bias voltage Vp is correspondingly adjusted in a linear manner. In other embodiments, the control unit 140 can set the bias voltage Vp in a step manner. For example, a resistance variation range of the pressure sensing device is divided into two sections (or a plurality of sections) of a high resistance section and a low resistance section, etc. When the resistance value of the pressure sensing device falls in the high resistance section, the control unit 140 sets the bias voltage Vp to the high voltage level. When the resistance value of the pressure sensing device falls in the low resistance section, the control unit 140 sets the bias voltage Vp to the low voltage level. In this way, the power loss of the sensor unit 110 due to that the flexible pressure sensing devices are in a large pressure environment for a long time can be reduced.

Referring to FIG. 5 and FIG. 6, after the period T is ended, the pressure (the physical energy) is removed, so that the electric signal αVs is transited to the low voltage level. Due to the delay effect of the delay circuit 131, after a time period Δt2 that the electric signal αVs is transited to the low voltage level, the delayed signal αVs' is accordingly transited to the low voltage level. During the time period Δt2, the comparison circuit 132 subtracts the delayed signal αVs' from the electric signal αVs to obtain the checking result Vc' of a negative pulse. Therefore, the control unit 140 learns that the pressure is removed from the sensor unit 110 according to the negative pulse in the checking result Vc' (or Vc). A voltage swing of the negative pulse in the checking result Vc' corresponds to a pressure variation of the sensor unit 110, and the voltage swing of the positive pulse in the checking result Vc' also corresponds to a resistance variation of the sensor unit 110. Therefore, the control unit 140 can learn whether the pressure is removed from the sensor unit 110 according to the voltage swing of the negative pulse.

In other embodiments, when the control unit 140 enters the low power mode, the control unit 140 controls the adjustable bias unit 150 to decrease the bias voltage Vp and provide the bias voltage Vp to the sensor subjected to the physical energy 10 in the sensor unit 110, and the control unit 140 disables the other sensors that are not subjected to the physical energy 10. For example, it is assumed that a pressure is applied to the sensor 411, and the other sensors 412-419 are not subjected to the pressure, when the control unit 140 enters the low power mode, the control unit 140 decreases the bias voltage Vp, and provides the bias voltage Vp to the sensor 411. Meanwhile, the control unit 140 disables the sensors 412-419, for example, does not provide the bias voltage Vp to the sensors 412-419.

Figure 7:
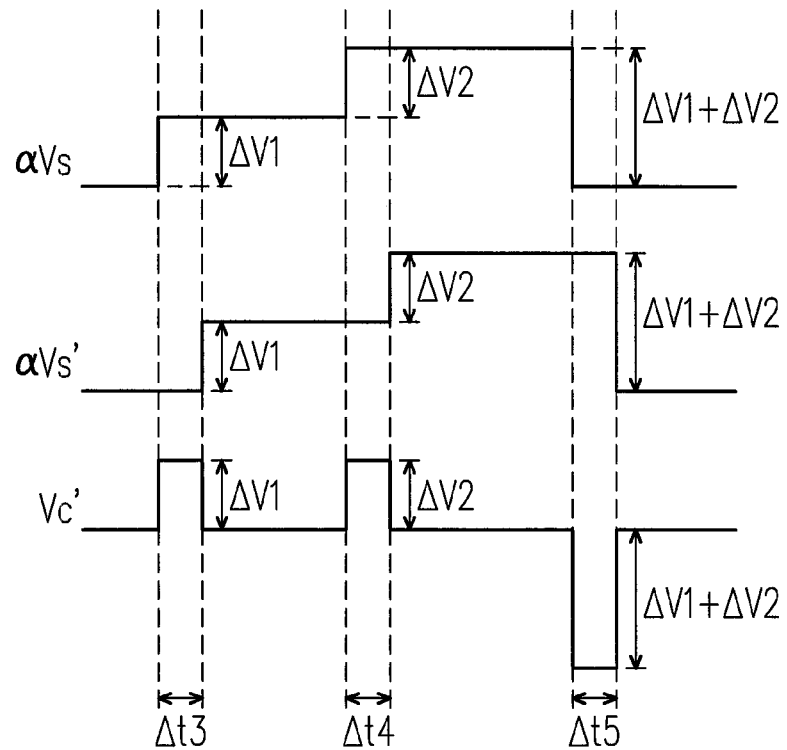
FIG. 7 is a timing schematic diagram of signals shown in FIG. 5 according to another embodiment of the disclosure.

FIG. 7 is a timing schematic diagram of the signals shown in FIG. 5 according to another embodiment of the disclosure. The embodiment of FIG. 7 can refer to related descriptions of FIG. 1 to FIG. 6. The embodiment of FIG. 7 can be applied to multi-step pressure signal sensing status. Referring to FIG. 5 and FIG. 7, when the pressure (the physical energy) is not applied to any one of the pressure sensors in the sensor unit 110, the control unit 140 operates in a normal working mode. Now, the electric signal αVs and the delayed signal αVs' are all in the low voltage level.

Once the flexible pressure sensing device (the sensor unit 110) is subjected to a pressure, besides reading a sensing pressure value, the control unit 140 also controls the peripheral devices to enter the low power mode (for example, correspondingly decrease the bias voltage Vp), and meanwhile records the corresponding pressure value. A magnitude of the pressure applied to the sensor unit 110 is reflected on the voltage levels of the electric signal αVs and the delayed signal αVs'. If the pressure continuously increases (or decreases), the electric signal αVs accordingly increases (or decreases). For example, if the pressure is increased by s kilograms, the voltage level of the electric signal αVs is accordingly increased by ΔV1. Therefore, during the time period Δt3, the comparison circuit 132 obtains the checking result Vc' of the positive pulse by subtracting the delayed signal αVs' from the electric signal αVs, where a pulse swing is about ΔV1. In the present embodiment, the control unit 140 can accumulate (count) the pulse swing ΔV1 during the time period Δt3 to a counting value. Now, the counting value is ΔV1 volts. The control unit 140 can deduce to learn that the pressure sensed by the sensor unit 110 to be s kilograms according to the ΔV1 volts.

In another embodiment, the control unit 140 deduces to learn that the pressure of the sensor unit 110 is increased by s kilograms according to the pulse swing ΔV1 of the checking result Vc' during the time period Δt3. Therefore, the control unit 140 can add the pressure increase of s kilograms to the counting value. Now, the counting value is s kilograms.

After a period of time, when the pressure applied to the sensor unit 110 is increased to s+t kilograms, the voltage level of the electric signal αVs is correspondingly increased by ΔV2. Therefore, during a time period Δt4, the comparison circuit 132 obtains the checking result Vc' of the positive pulse by subtracting the delayed signal αVs' from the electric signal αVs, where the pulse swing is about ΔV2. Therefore, the control unit 140 can accumulate (count) the positive pulse swing in the checking result Vc' (or Vc) to learn the pressure sensed by the sensor unit 110. For example, in the present embodiment, the control unit 140 can accumulate (count) the pulse swing ΔV2 during the time period Δt4 to the counting value. Now, the counting value is ΔV1+ΔV2 volts. The control unit 140 can deduce to learn that the pressure sensed by the sensor unit 110 to be s+t kilograms according to the ΔV1+ΔV2 volts. On the other hand, according to the pulse swing ΔV2 in the checking result Vc' (or Vc), the control unit 140 can correspondingly decrease the bias voltage Vp again.

In another embodiment, the control unit 140 deduces to learn that the pressure of the sensor unit 110 is increased by t kilograms according to the pulse swing ΔV2 during the time period Δt4. Therefore, the control unit 140 can add the pressure increase of t kilograms to the counting value. Now, the counting value is s+t kilograms.

After another period of time, when the pressure applied to the sensor unit 110 is all removed (i.e. the pressure is decreased by s+t kilograms), the voltage level of the electric signal αVs is correspondingly decreased by ΔV1+ΔV2. Therefore, during a time period Δt5, the comparison circuit 132 obtains the checking result Vc' of the negative pulse by subtracting the delayed signal αVs' from the electric signal αVs, where the pulse swing is about −(ΔV1+ΔV2). Therefore, the control unit 140 can accumulate (count) the all of the pulse swings in the checking result Vc' (or Vc) to learn a current pressure sensed by the sensor unit 110. For example, the control unit 140 can accumulate (count) the pulse swing −(ΔV1+ΔV2) during the time period Δt5 to the counting value. Now, the counting value is ΔV1+ΔV2−(ΔV1+ΔV2)=0 volt. Since the counting value is 0 volt, the control unit 140 learns that the pressure sensed by the sensor unit 110 is 0 kilogram. Therefore, the control unit 140 returns to the normal working mode (for example, the control unit 140 recovers the bias voltage Vp to the initial voltage).

In another embodiment, the control unit 140 deduces to learn that the pressure of the sensor unit 110 is decreased by s+t kilograms according to the pulse swing −(ΔV1+ΔV2) during the time period Δt5. Therefore, the control unit 140 can add the pressure variation of −(s+t) kilograms to the counting value. Now, the counting value is s+t−(s+t)=0 kilograms.

Figure 8:
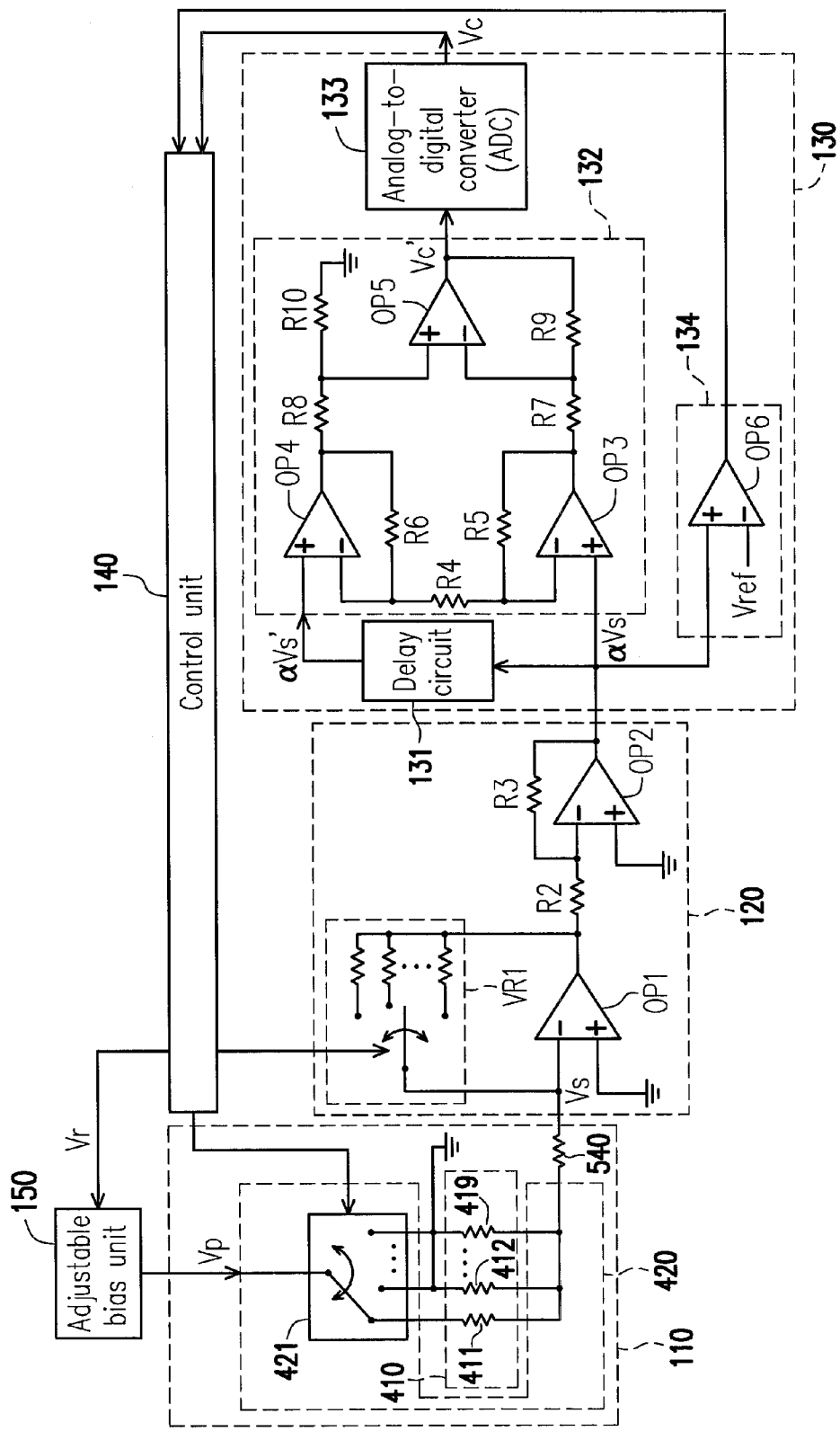
FIG. 8 is a circuit schematic diagram of the readout apparatus of FIG. 1 according to another embodiment of the disclosure.

FIG. 8 is a circuit schematic diagram of the readout apparatus 100 of FIG. 1 according to another embodiment of the disclosure. Description of the embodiment of FIG. 8 can refer to related descriptions of FIG. 1 to FIG. 7. A difference between the embodiments of FIG. 5 and FIG. 8 is that the checking unit 130 of FIG. 8 further includes a trigger circuit 134. Referring to FIG. 8, an input terminal of the trigger circuit 134 is coupled to the output terminal of the signal converting unit 120, and an output terminal of the trigger circuit 134 is coupled to the control unit 140. The trigger circuit 134 determines whether physical energy is applied to the sensor unit 110 according to the electric signal αVs. When the physical energy is applied to the sensor unit 110, the trigger circuit 134 triggers the control unit 140 to enter the low power mode. In the low power mode, the control unit 140 controls the adjustable bias unit 150 to decrease the bias voltage Vp.

FIG. 8 illustrates an embodiment of the trigger circuit 134, though implementation of the trigger circuit 134 is not limited to that shown in FIG. 8. In the embodiment of FIG. 8, the trigger circuit 134 includes a comparator (or an operational amplifier) OP6. A non-inverted input terminal of the comparator OP6 is coupled to the output terminal of the signal converting unit 120. An inverted input terminal of the comparator OP6 is coupled to a reference voltage Vref. An output terminal of the comparator OP6 is coupled to the control unit 140. As the pressure applied to the sensor unit 110 is increased, the voltage level of the electric signal αVs is also increased. When the voltage level of the electric signal αVs is greater than the reference voltage Vref, the comparator OP6 outputs a trigger signal to the control unit 140, and the control unit 140 accordingly enters the low power mode. In some embodiments, the aforementioned reference voltage Vref can be a fixed voltage provided by a voltage source. In the present embodiment, the voltage level of the reference voltage Vref is dynamically determined by the control unit 140.

Referring to FIG. 6, FIG. 8 and related descriptions thereof, when a swing value of the electric signal αVs is lower than a threshold voltage (i.e. the reference voltage Vref) set by the trigger circuit 134, it represents that a pressure-subjected state of the flexible pressure sensing device of the sensor unit 110 is not changed, and the control unit 140 waits for a next trigger signal generated by the trigger circuit 134 when the pressure-subjected state of the flexible pressure sensing device is changed. Once the flexible pressure sensing device is subjected to a pressure, the trigger circuit 134 generates the trigger signal to notify the control unit 140 to perform pressure signal extraction and processing, and the control unit 140 enters the low power mode after completing the pressure signal extraction and processing. In the low power mode, the control unit 140 can control working clocks, working voltages and/or bias voltages of related devices (for example, the adjustable bias unit 150, the ADC 133 and the control unit 140, etc.). If the pressure-subjecting state of the sensor unit 110 is not changed after the low power mode is entered, the control unit 140 can further decrease a scanning frequency of the sensor unit 110. The control unit 140 returns back to the initial normal working mode until the pressure on the flexible pressure sensing device is released.

In other embodiments, the input terminal of the trigger circuit 134 is not coupled to the output terminal of the signal converting unit 120. The input terminal of the trigger circuit 134 can be coupled to the output terminal of the comparison circuit 132 for receiving the checking result Vc'. When a pulse signal value of a differential signal of the electric signal αVs and the delayed signal αVs' (i.e. the pulse swing of the checking result Vc') is lower than the threshold voltage (i.e. the reference voltage Vref) set by the trigger circuit 134, it represents that the pressure-subjected state of the flexible pressure sensing device of the sensor unit 110 is not changed. Once the pulse swing of the checking result Vc' is greater than the reference voltage Vref, the trigger circuit 134 generates the trigger signal to notify the control unit 140 to perform pressure signal extraction and processing, and the control unit 140 enters the low power mode after completing the pressure signal extraction and processing. The control unit 140 returns back to the initial normal working mode until the pressure on the flexible pressure sensing device is released.

Referring to FIG. 7, FIG. 8 and related descriptions thereof, the present embodiment can be applied to multi-step pressure signal sensing status. When the electric signal αVs is lower than the threshold voltage (i.e. the reference voltage Vref) set by the trigger circuit 134, it represents that the pressure-subjected state of the flexible pressure sensing device of the sensor unit 110 is not changed. The control unit 140 waits for a next trigger signal generated by the trigger circuit 134 when the pressure-subjected state of the flexible pressure sensing device is changed. Once the flexible pressure sensing device is subjected to a pressure, besides reading a sensing pressure value, the control unit 140 also controls the related peripheral devices to enter the low power mode, and meanwhile records the corresponding pressure value. If the pressure continuously increases (or decreases), the pressure value recorded in the internal of the control unit 140 is also increased (or decreased). The control unit 140 returns back to the initial normal working mode until the pressure is released (i.e. the pressure applied to the flexible pressure sensing device of the sensor unit 110 is zero).

Figure 9:
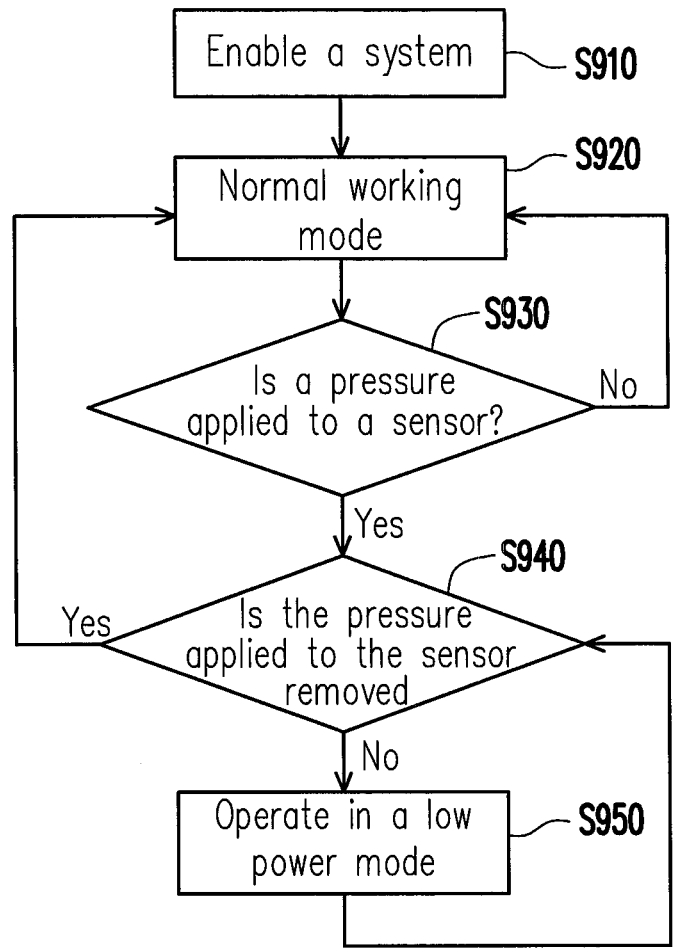
FIG. 9 is a flowchart illustrating a sensor driving method of the readout apparatus of FIG. 1 according to an embodiment of the disclosure.

FIG. 9 is a flowchart illustrating a sensor driving method of the readout apparatus 100 of FIG. 1 according to an embodiment of the disclosure. The driving method includes following steps. First, a system (including the readout apparatus 100) is enabled (step S910). After the readout apparatus 100 is enabled, the readout apparatus 100 is operated in the normal working mode (step S920). In the normal working mode, the adjustable bias unit 150 provides, adjusts and outputs the bias voltage Vp to a bias terminal of the sensor unit 110, and sets the bias voltage Vp to an initial voltage. The sensor unit 110 senses the physical energy 10 by using the bias voltage Vp to obtain the sensing result Vs. The signal converting unit 120 correspondingly converts the sensing result Vs to the electric signal αVs. The checking unit 130 checks the electric signal αVs to obtain the checking result Vc.

In some embodiments, the step that the signal converting unit 120 converts the sensing result Vs into the electric signal αVs includes following steps: the control unit 140 dynamically determines the gain value α, and the signal converting unit 120 reads the sensing result Vs according to the gain value α, so as to obtain the electric signal αVs.

The control unit 140 performs a step S930 to determine whether the physical energy 10 (for example, a pressure, etc.) is applied to the sensors of the sensor unit 110 according to the checking result Vc. If the checking result Vc indicates that the physical energy 10 is not applied to the sensors (for example, the pulse swing of the checking result Vc is smaller than the threshold voltage), the control unit 140 continuously operates in the normal working mode. For example, when the checking result Vc indicates that the physical energy 10 is not applied to the sensor unit 110, the control unit 140 controls the adjustable bias unit 150 to output the initial voltage to serve as the bias voltage Vp.

When the checking result Vc indicates that the physical energy 10 is applied to the sensor unit 110 (for example, the pulse swing of the checking result Vc is greater than the threshold voltage), the control unit 140 correspondingly performs a step S940 and/or a step S950, so as to control the adjustable bias unit 150 to correspondingly adjust the bias voltage Vp according to the checking result Vc. In the step S940, the control unit 140 can determine whether the physical energy 10 (for example, a pressure, etc.) applied on the sensor unit 110 is removed. If the physical energy 10 is not applied to the sensor unit 110, the control unit 140 returns to the step S920 to operate in the normal working mode and set the bias voltage Vp to the initial voltage. If the checking result Vc indicates that the physical energy 10 of the sensor unit 110 is not removed, the control unit 140 performs the step S950 to enter the low power mode. In the low power mode, the control unit 140 controls the adjustable bias unit 150 to decrease the bias voltage Vp. In other embodiments, the control unit 140 further decreases a frequency of reading the sensor unit 110 in the low power mode.

In some embodiments, the control unit 140 can provide a lookup table. The lookup table records a relationship between the physical energy 10 and the bias voltage Vp. In the step S950, the control unit 140 can deduce a magnitude of the physical energy 10 according to the electric signal αVs (or the checking result Vc), so as to determine the bias voltage Vp of the adjustable bias unit 150 according to the magnitude of the physical energy 10 by looking up the lookup table.

In some other embodiments, the sensor unit 110 includes a plurality of sensors. In the low power mode (step S950), the control unit 140 controls the adjustable bias unit 150 to decrease the bias voltage Vp and provides the bias voltage Vp to one of the sensors that is subjected to the physical energy 10, and disables the other sensors that are not subjected to the physical energy 10.

Figure 10:
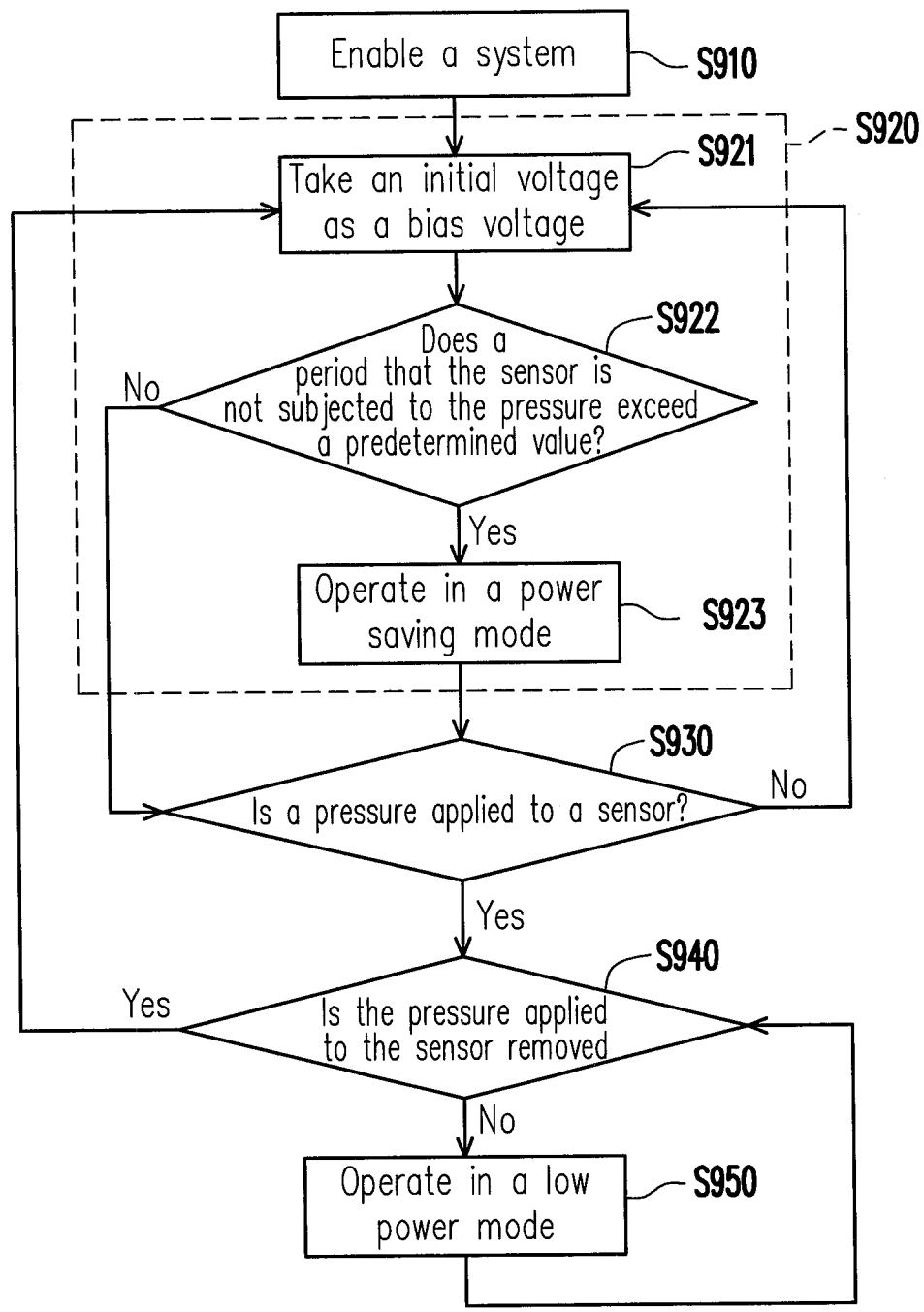
FIG. 10 is a flowchart illustrating a sensor driving method of the readout apparatus of FIG. 1 according to another embodiment of the disclosure.

FIG. 10 is a flowchart illustrating a sensor driving method of the readout apparatus 100 of FIG. 1 according to another embodiment of the disclosure. The embodiment shown in FIG. 10 can refer to related descriptions of the embodiment of FIG. 9, and a difference there between is that the step S920 of FIG. 10 further includes sub steps S921-S923. After the system is enabled (step S910), the control unit 140 controls the adjustable bias unit 150 to generate an initial voltage (for example, 3.3V or 5V), and takes the initial voltage as the bias voltage Vp (step S921). Then, the control unit 140 can learn a time length during which none physical energy 10 (for example, pressure) is applied on the sensor unit 110 according to the electric signal αVs (or the checking result Vc), and determines whether a period (time length) that the sensor unit 110 is not subjected to the physical energy (for example, pressure) exceeds a predetermined value (step S922). The predetermined value can be determined according to a design requirement of an actual product, for example, 30 minutes, one hour, etc.

If the determination result of the step S922 is negative, the control unit 140 executes the step S930. If the determination result of the step S922 is affirmative, the control unit 140 executes the step S923 to enter a power saving mode. For example, the control unit 140 can decrease a frequency of reading the sensor unit 110 in the power saving mode. In the power saving mode, the control unit 140 can execute the step S930 to determine whether the physical energy 10 (for example, a pressure, etc.) is applied to the sensors of the sensor unit 110 according to the checking result Vc.

Figure 11:
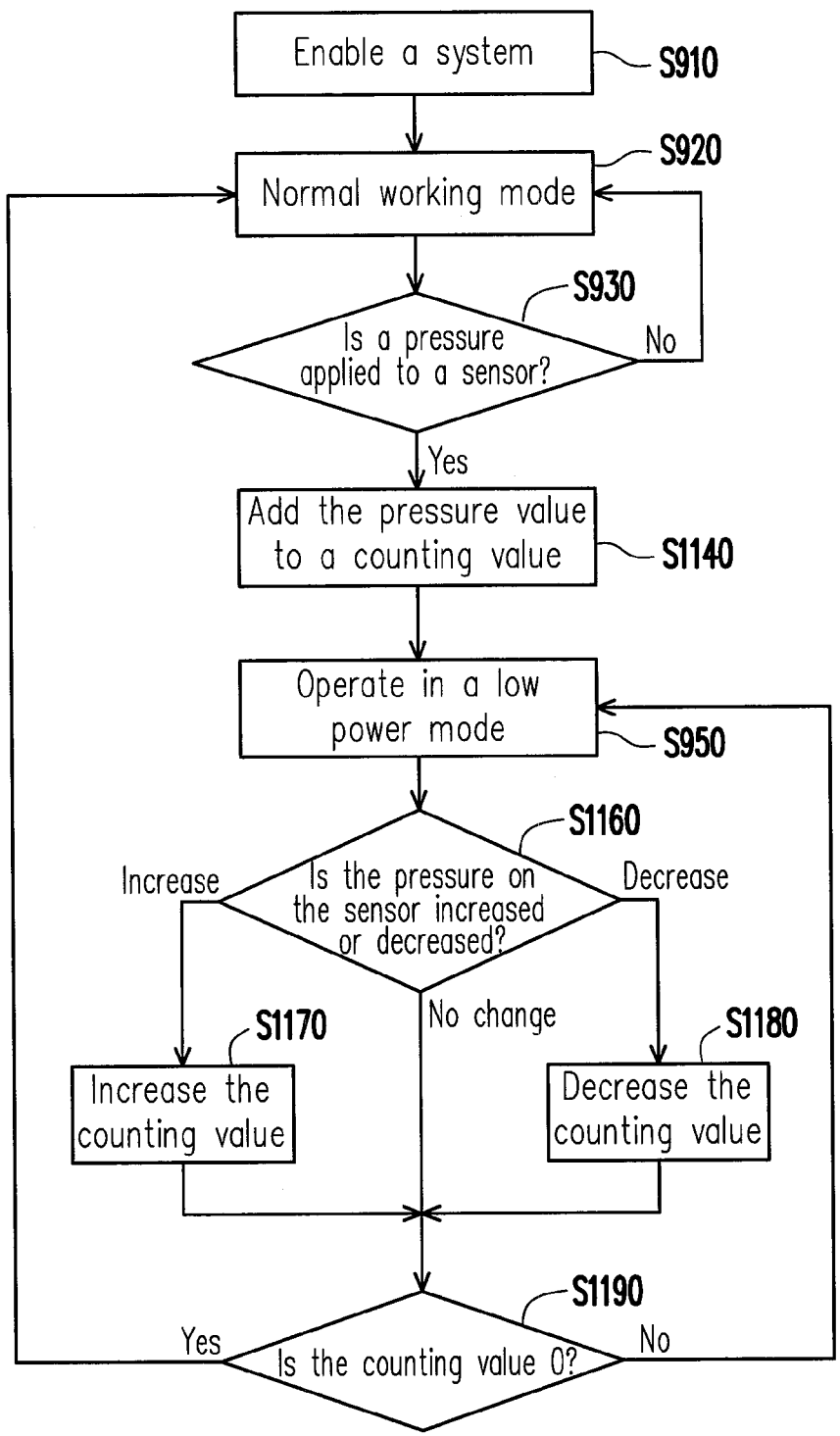
FIG. 11 is a flowchart illustrating a sensor driving method of the readout apparatus of FIG. 1 according to still another embodiment of the disclosure.

FIG. 11 is a flowchart illustrating a sensor driving method of the readout apparatus 100 of FIG. 1 according to still another embodiment of the disclosure. The embodiment shown in FIG. 11 can refer to related descriptions of the embodiment of FIG. 9, and a difference there between is that the embodiment of FIG. 11 includes steps S1140-S1190. If the determination result of the step S930 if affirmative, i.e. the physical energy 10 is applied to the sensor unit 110, the control unit 140 performs the step S1140. In the step S1140, when the checking result Vc indicates that the physical energy 10 applied to the sensor unit 110 is increased by a first energy value, the control unit 140 adds the first energy value to a counting value. After the step S1140 is completed, the control unit 140 performs the step S950 to enter the low power mode. In the low power mode, the control unit 140 can control the adjustable bias unit 150 to correspondingly decrease the bias voltage Vp according to the counting value.

After entering the low power mode, the control unit 140 determines a variation of the physical energy 10 applied to the sensor unit 110 according to the checking result Vc (step S1160). When the checking result Vc indicates that the physical energy 10 applied to the sensor unit 110 is increased by a second energy value, the control unit 140 performs a step S1170 to add the second energy value to the counting value. For example, the counting value is the first energy value+the second energy value. After the step S1170 is completed, the control unit 140 further performs the step S1190.

In the step S1160, if the checking result Vc indicates that the physical energy 10 applied to the sensor unit 110 is decreased by a third energy value, the control unit 140 performs the step S1180 to subtract the third energy value from the counting value. For example, the counting value is now: the first energy value−the third energy value. After the step S1180 is completed, the control unit 140 further performs the step S1190.

In the step S1160, if the checking result Vc indicates that the physical energy 10 applied to the sensor unit 110 is not increased or decreased, the control unit 140 performs the step S1190. In the step S1190, the control unit 140 determines whether the counting value is 0, so as to control the adjustable bias unit 150 to adjust the bias voltage Vp according to the counting value. If the counting value is not 0, it represents that the physical energy 10 is still applied to the sensor unit 110, and the control unit 140 returns to the step S950 to correspondingly decrease the bias voltage Vp according to the counting value. If the counting value is 0, it represents that the physical energy 10 is not applied to the sensor unit 110, and the control unit 140 returns to the step S920 to set the bias voltage Vp to the initial voltage.

In other embodiments, the step S1190 is to determine whether the counting value is within an empty load range including 0, where an upper and lower boundaries of the predetermined range are respectively a positive threshold and a negative threshold. When the counting value falls within the empty load range, the control unit 140 controls the adjustable bias unit 150 to set the bias voltage Vp to the initial voltage (step S920).

In summary, the aforementioned embodiments can be implemented through software, firmware and/or hardware. In the readout apparatus and the driving method for sensor of the disclosure, a current usage state of the sensor can be determined, and the bias voltage supplied to the sensor is automatically adjusted. The readout apparatus for sensor in the aforementioned embodiments can effectively reduce a continuous power loss of the sensing devices in long-term detection. For example, regarding a system that uses the flexible pressure sensing devices to perform long-term pressure detection (for example, an application product such as a home medical care mattress/cushion, or factory automation equipment, etc.), the disclosure provides a complete set of array-type pressure sensing system solution with high-energy efficiency, so that the design of the system product is more complied with a trend of environmental protection and energy saving. The readout apparatus for sensor in the aforementioned embodiments can read a pressure value of the flexible pressure sensing device at a transient when the flexible pressure sensing device is subjected to a pressure, and neglect the other pressure values of the stable state until a pressure state of the pressure sensing device is again changed. The readout apparatus for sensor can determine a current pressure state of the sensor, and automatically adjust the bias voltage Vp to a best working mode, so as to effectively resolve the problem of continuous power loss caused by the long-term pressure detection.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A readout apparatus for sensor, comprising: an adjustable bias unit, adjusting and outputting a bias voltage; a sensor unit, having a bias terminal coupled to the adjustable bias unit for receiving the bias voltage, wherein the sensor unit senses a physical energy by using the bias voltage, and an output terminal of the sensor unit outputs a sensing result; a signal converting unit, having an input terminal coupled to the output terminal of the sensor unit for receiving the sensing result, and outputting an electric signal according to the sensing result; a checking unit, having an input terminal coupled to the signal converting unit for receiving and checking the electric signal, and an output terminal outputting a checking result; and a control unit, coupled to the adjustable bias unit and the output terminal of the checking unit, wherein the control unit controls the adjustable bias unit to adjust the bias voltage according to the checking result and wherein the control unit dynamically determines a gain value, and the signal converting unit reads the sensing result according to the gain value, so as to obtain the electric signal corresponding to the sensor unit.

2. The readout apparatus for sensor as claimed in claim 1, wherein the adjustable bias unit comprises:
a variable resistor, having a first terminal coupled to a voltage source, a second terminal outputting the bias voltage, wherein a resistance value of the variable resistor is controlled by the control unit.

3. The readout apparatus for sensor as claimed in claim 1, wherein the adjustable bias unit comprises:
a plurality of resistors, having first terminals commonly coupled to the sensor unit for outputting the bias voltage, wherein resistance values of the resistors are different to each other; and
a switch, controlled by the control unit, and selectively coupling a voltage source to a second terminal of one of the resistors.

4. The readout apparatus for sensor as claimed in claim 1, wherein the sensor unit comprises:
a sensor array; and
a switch circuit, coupled to the sensor array,
wherein the control unit controls the switch circuit to perform a switch operation to select a target sensor from a plurality of sensors in the sensor array, and the signal converting unit selectively senses the target sensor in the sensors according to the switch operation of the switch circuit, and gains the sensing result to output as the electric signal.

5. The readout apparatus for sensor as claimed in claim 4, wherein the sensors are pressure sensors, the switch circuit performs the switch operation to switch the bias voltage to the target sensor, and the switch circuit couples a reference voltage lower than the bias voltage to the other sensors in the sensors other than the target sensor.

6. The readout apparatus for sensor as claimed in claim 5, wherein the reference voltage is a ground voltage or a system lowest voltage.

7. The readout apparatus for sensor as claimed in claim 4, wherein the sensor unit further comprises:
an overload protector, connected in series between the target sensor and the signal converting unit.

8. The readout apparatus for sensor as claimed in claim 7, wherein the overload protector is a thermal resistor, one of the overload protector and the target sensor has a positive temperature coefficient, and another one thereof has a negative temperature coefficient.

9. The readout apparatus for sensor as claimed in claim 7, wherein the sensor unit further comprises:
a thermal resistor, connected in parallel with the overload protector, wherein one of the thermal resistor and the target sensor has a positive temperature coefficient, and another one thereof has a negative temperature coefficient.

10. The readout apparatus for sensor as claimed in claim 1, wherein the signal converting unit comprises:

a first amplifier, having a non-inverted input terminal coupled to a reference voltage, an inverted input terminal coupled to the sensor unit; and
a first variable resistor unit, having a first terminal and a second terminal respectively coupled to the inverted input terminal and an output terminal of the first amplifier, wherein the resistance value of the first variable resistor unit is controlled by the control unit.

11. The readout apparatus for sensor as claimed in claim 10, wherein the signal converting unit further comprises:
a second amplifier, having a non-inverted input terminal coupled to the reference voltage, and an output terminal providing the electric signal to the checking unit;
a second resistor, having a first terminal and a second terminal respectively coupled to the output terminal of the first amplifier and an inverted input terminal of the second amplifier; and
a third resistor, having a first terminal and a second terminal respectively coupled to the inverted input terminal of the second amplifier and the output terminal of the second amplifier.

12. The readout apparatus for sensor as claimed in claim 1, wherein the checking unit comprises:
a delay circuit, having an input terminal coupled to the signal converting unit for receiving the electric signal; and
an error amplifier, having an inverted input terminal coupled to the signal converting unit for receiving the electric signal, a non-inverted input terminal coupled to an output terminal of the delay circuit, and an output terminal outputting the checking result.

13. The readout apparatus for sensor as claimed in claim 1, wherein the checking unit comprises:
a delay circuit, having an input terminal coupled to the signal converting unit for receiving the electric signal; and
a subtractor, receiving the electric signal and a signal at an output terminal of the delay circuit and calculating a difference there between, and outputting the difference to serve as the checking result.

14. The readout apparatus for sensor as claimed in claim 1, wherein the checking unit comprises:
a delay circuit, having an input terminal coupled to the signal converting unit for receiving the electric signal; and
a comparison circuit, having a first input terminal coupled to the signal converting unit for receiving the electric signal, and a second input terminal coupled to an output terminal of the delay circuit.

15. The readout apparatus for sensor as claimed in claim 14, wherein the comparison circuit comprises:
a third amplifier, having a non-inverted input terminal coupled to the signal converting unit for receiving the electric signal;
a fourth amplifier, having a non-inverted input terminal coupled to the output terminal of the delay circuit;
a fourth resistor, having a first terminal and a second terminal respectively coupled to an inverted input terminal of the third amplifier and an inverted input terminal of the fourth amplifier;
a fifth resistor, having a first terminal and a second terminal respectively coupled to the inverted input terminal and an output terminal of the third amplifier;
a sixth resistor, having a first terminal and a second terminal respectively coupled to the inverted input terminal and an output terminal of the fourth amplifier;

a seventh resistor, having a first terminal coupled to the output terminal of the third amplifier;
an eighth resistor, having a first terminal coupled to the output terminal of the fourth amplifier;
a fifth amplifier, having an inverted input terminal coupled to a second terminal of the seventh resistor, a non-inverted input terminal coupled to a second terminal of the eighth resistor, and an output terminal serving as an output terminal of the comparison circuit;
a ninth resistor, having a first terminal and a second terminal respectively coupled to the inverted input terminal and the output terminal of the fifth amplifier; and
a tenth resistor, having a first terminal coupled to the non-inverted input terminal of the fifth amplifier, and a second terminal coupled to a reference voltage.

16. The readout apparatus for sensor as claimed in claim 14, wherein the checking unit further comprises:
an analog-to-digital converter, having an input terminal coupled to an output terminal of the comparison circuit, and an output terminal of the analog-to-digital converter providing the checking result to the control unit.

17. The readout apparatus for sensor as claimed in claim 14, wherein the comparison circuit subtracts a delay signal output by the delay circuit from the electric signal to obtain a pulse, a voltage swing of the pulse corresponds to the sensing result of the sensor unit, and the control unit controls the adjustable bias unit to correspondingly adjust the bias voltage according to the voltage swing of the pulse.

18. The readout apparatus for sensor as claimed in claim 14, wherein the voltage swing of the electric signal and a voltage swing of a delay signal output by the delay circuit correspond to the sensing result of the sensor unit, the comparison circuit subtracts the delay signal from the electric signal to obtain a pulse, the control unit accumulates a voltage swing of the pulse to a counting value, and the control unit controls the adjustable bias unit to correspondingly adjust the bias voltage according to the counting value.

19. The readout apparatus for sensor as claimed in claim 14, wherein the checking unit further comprises:
a trigger circuit, having an input terminal and an output terminal respectively coupled to the signal converting unit and the control unit, wherein the trigger circuit determines whether the physical energy is applied to the sensor unit according to the electric signal, and when the physical energy is applied to the sensor unit, the trigger circuit triggers the control unit to enter a low power mode.

20. The readout apparatus for sensor as claimed in claim 19, wherein the trigger circuit comprises:
a comparator, having a non-inverted input terminal coupled to the signal converting unit, an inverted input terminal coupled to a reference voltage, and an output terminal coupled to the control unit.

21. The readout apparatus for sensor as claimed in claim 1, wherein the control unit has a lookup table for recording a relationship between the physical energy and the bias voltage, and the control unit deduces the physical energy according to the electric signal, so as to determine the bias voltage of the adjustable bias unit according to the physical energy by looking up the lookup table.

22. The readout apparatus for sensor as claimed in claim 1, wherein the control unit controls the adjustable bias unit to output an initial voltage to serve as the bias voltage when the checking result of the checking unit indicates that the physical energy is not applied to the sensor unit.

23. The readout apparatus for sensor as claimed in claim 1, wherein the control unit enters a low power mode to control the adjustable bias unit to decrease the bias voltage when the checking result of the checking unit indicates that the physical energy is applied to the sensor unit.

24. The readout apparatus for sensor as claimed in claim 23, wherein the sensor unit comprises a plurality of sensors, in the low power mode, the control unit controls the adjustable bias unit to decrease the bias voltage for providing to the sensor in the sensors that is subjected to the physical energy, and the control unit disables the other sensors in the sensors that are not subjected to the physical energy.

25. The readout apparatus for sensor as claimed in claim 23, wherein in the low power mode, the control unit decreases a frequency that the readout apparatus reads the sensor unit.

26. The readout apparatus for sensor as claimed in claim 1, wherein the control unit adds a first energy value to a counting value when the checking result of the checking unit indicates that the physical energy applied to the sensor unit is increased by the first energy value, and the control unit subtracts a second energy value from the counting value when the checking result of the checking unit indicates that the physical energy applied to the sensor unit is decreased by the second energy value.

27. The readout apparatus for sensor as claimed in claim 26, wherein the control unit controls the adjustable bias unit to adjust the bias voltage according to the counting value.

28. The readout apparatus for sensor as claimed in claim 26, wherein the control unit controls the adjustable bias unit to set the bias voltage to an initial voltage when the counting value falls within an empty load range.

29. A driving method for sensor, comprising:
adjusting and outputting a bias voltage to a bias terminal of a sensor unit by an adjustable bias unit;
sensing physical energy by the sensor unit by using the bias voltage, so as to obtain a sensing result;
correspondingly converting the sensing result into an electric signal;
checking the electric signal to obtain a checking result; and
controlling the adjustable bias unit to adjust the bias voltage according to the checking result, and controlling the adjustable bias unit to output an initial voltage to serve as the bias voltage when the checking result indicates that the physical energy is not applied to the sensor unit.

30. The driving method for sensor as claimed in claim 29, wherein the step of correspondingly converting the sensing result into the electric signal comprises:
dynamically determine a gain value; and
reading the sensing result according to the gain value, so as to obtain the electric signal.

31. The driving method for sensor as claimed in claim 29, further comprising:
providing a lookup table, wherein the lookup table records a relationship between the physical energy and the bias voltage; and
deducing the physical energy according to the electric signal, so as to determine the bias voltage of the adjustable bias unit according to the physical energy by looking up the lookup table.

32. The driving method for sensor as claimed in claim 29, further comprising:
entering a low power mode to control the adjustable bias unit to decrease the bias voltage when the checking result indicates that the physical energy is applied to the sensor unit.

33. The driving method for sensor as claimed in claim 32, wherein the sensor unit comprises a plurality of sensors, and the driving method for sensor further comprises:

in the low power mode, controlling the adjustable bias unit to decrease the bias voltage for providing to the sensor in the sensors that is subjected to the physical energy;

in the lower power mode, disabling the other sensors in the sensors that are not subjected to the physical energy.

34. The driving method for sensor as claimed in claim 32, further comprising:

in the lower power mode, decreasing a frequency of reading the sensor unit.

35. The driving method for sensor as claimed in claim 29, further comprising:

adding a first energy value to a counting value when the checking result indicates that the physical energy applied to the sensor unit is increased by the first energy value; and subtracting a second energy value from the counting value when the checking result indicates that the physical energy applied to the sensor unit is decreased by the second energy value.

36. The driving method for sensor as claimed in claim 35, further comprising:

controlling the adjustable bias unit to adjust the bias voltage according to the counting value.

37. The driving method for sensor as claimed in claim 35, further comprising:

controlling the adjustable bias unit to set the bias voltage to an initial voltage by the control unit when the counting value falls within an empty load range.

* * * * *